(12) United States Patent
Brenner, Jr. et al.

(10) Patent No.: US 6,880,030 B2
(45) Date of Patent: Apr. 12, 2005

(54) UNIFIED EXCEPTION HANDLING FOR HIERARCHICAL MULTI-INTERRUPT ARCHITECTURES

(75) Inventors: Kenneth J. Brenner, Jr., Milford, NH (US); Richard E. Carter, Jr., Litchfield, NH (US)

(73) Assignee: Wind River Systems, Inc., Alameda, CA (US)

( * ) Notice: Subject to any disclaimer, the term of this patent is extended or adjusted under 35 U.S.C. 154(b) by 783 days.

(21) Appl. No.: 09/736,567

(22) Filed: Dec. 13, 2000

(65) Prior Publication Data

US 2002/0073131 A1 Jun. 13, 2002

(51) Int. Cl.⁷ .............................................. G06F 13/24
(52) U.S. Cl. ...................................... 710/269; 710/262
(58) Field of Search ........................ 710/269, 260–268; 712/40, 244, 228, 7, 214, 215, 235

(56) References Cited

U.S. PATENT DOCUMENTS

2002/0016880 A1 * 2/2002 Bhagat ........................ 710/261
2002/0099933 A1 * 7/2002 Nevill et al. ................. 712/228

OTHER PUBLICATIONS

Disabling Interrupts at Processor Level, Atmel AT91 ARM THUMB Microcontrollers, Application Note, Rev 1156A, 8/98, 3 pp. (http://www.eetasia.com/ARTICLES/2000AUG/2000AUG29_CT_AN7.PDF).*

Application Note 25: Exception handling on the ARM (including thumb–aware processors), ARM DAI 0025E, Advanced RISC Machines Ltd (ARM) Sep. 1996, 36 pp.*

Application Note 31: Using embeddedICE, ARM DAI 0031C Advanced RISC Machines Ltd (ARM) Feb. 1999, 30 pp.*

ARM architecture reference manual, ver B (et seq.), Jul. 26, 1996, pp. 2.1–2.10.*

* cited by examiner

Primary Examiner—Mark H. Rinehart
Assistant Examiner—Clifford Knoll
(74) Attorney, Agent, or Firm—Fay Kaplun & Marcin LLP

(57) ABSTRACT

A unified interrupt handling system and method is provided for an embeddable processor having multiple interrupt types. An instruction is inserted into the first vector address that disables the second interrupt mode. At the second vector address, an other instruction is inserted that branches to a common interrupt dispatcher. The common interrupt dispatcher is provided with an interrupt routine that processes the interrupt, and then re-enables the second interrupt modes. Interrupt requests are then processed by the common interrupt dispatcher without interruption.

28 Claims, 2 Drawing Sheets

UNIFIED EXCEPTION HANDLING FOR HIERARCHICAL MULTI-INTERRUPT ARCHITECTURES

BACKGROUND INFORMATION

The skilled artisan will recognize that in microprocessor operation, exceptions arise when there is a need for the normal flow of program execution to be broken, for example, so that the processor can be diverted to handle an interrupt from a peripheral. The processor state just prior to handling the exception must be preserved so that the original program can be resumed when the exception routine has completed. Many exceptions may arise at the same time.

One common type of microprocessor is sold under the trademark ARM®, owned by Advanced RISC Machines, Ltd. (Cambridge, UK) based on an architecture set forth in the *ARM Architecture Reference Manual*, Version B (et. seq.), dated Jul. 26, 1996, pages 2–1 to 2–10 of which are incorporated by reference herein. (A product line of such ARM® type processors, including the SA-110™ microprocessor, is available from INTEL® Corporation (San Jose, Calif.). Such ARM® processors handle exceptions by making use of banked registers to save the processor state. The old program counter (PC) and Current Processor Status Register (CPSR) contents are copied into appropriate registers (e.g., R14 and SPSR), and the PC and mode bits in the CPSR bits are forced to a value that depends on the exception. Interrupt disable flags may be set to try and prevent otherwise unmanageable nestings of exceptions. For example, upon receiving an interrupt, the interrupt disable flags may be set to prevent new interrupts from being accepted until the current interrupt has been processed.

These ARM® processors separate interrupt handling into discrete instruction streams, i.e., one for IRQs (Interrupt Requests) and another for FIQs (Fast Interrupt Requests). The ARM® architecture generally contemplates that FIQs are to be used for relatively high priority interrupts, such as memory refresh, that are intended to run beneath the Operating System (OS). As such, FIQs are provided with a higher priority than IRQs, and may interrupt the processing of a pending IRQ exception call. In practice, however, it has been found by the inventors of the present invention that users often use FIQs as a part of a multi-tiered interrupt system usable by the OS. Disadvantageously, such use often results in complex nested interrupt stacks which the OS has difficulty, or is unable, to 'unwind' and properly process these interrupts. As a result, the OS is often unable to support calls from both IRQ and FIQ devices.

Thus, a need exists for an improved method and system for providing a single interrupt instruction stream for both multiple (e.g., IRQ and FIQ) exceptions.

SUMMARY

An embodiment of this invention includes a method of configuring an operating system for an embeddable processor having multiple interrupt types. The method includes the steps of providing an interrupt vector table, which has a first vector address executable upon receipt of an interrupt request of a first type, and a second vector address executable upon receipt of an interrupt request of a second type. The first vector address precedes the second vector address in the vector table. A common interrupt dispatcher is provided. An instruction is inserted into the first vector address that disables the second interrupt mode. At the second vector address, an other instruction is inserted that branches to the common interrupt dispatcher. The common interrupt dispatcher is provided with an interrupt routine that processes the interrupt, and then re-enables the second interrupt type. Interrupt requests are then processed by the common interrupt dispatcher without interruption.

Another aspect of the invention includes a method for configuring an operating system for ARM® processors. The method includes the steps of providing a common interrupt dispatcher, and inserting an instruction into the IRQ vector address that disables the FIQ interrupt mode. An other instruction that branches to the common interrupt dispatcher is inserted at the FIQ vector address. The common interrupt dispatcher is provided with an interrupt routine that processes the interrupt, and then re-enables the FIQ interrupt mode.

A further aspect of the invention includes method of operating a processor. This method includes the steps of providing a common interrupt dispatcher having an interrupt routine that checks a mode identifier to determine whether a received interrupt was of a first or second type, and processes the interrupt. Additional steps include inserting into a first vector address of an interrupt vector table, an instruction that disables subsequent interrupts. An other instruction is inserted at a second vector address of the exception vector table, that branches to the common interrupt dispatcher. An interrupt of the first type is received, followed by branching to the first vector address, and setting the mode identifier to indicate an interrupt of the first type was received. The instruction to disable the first and second interrupts is executed, and the other instruction is executed to branch to the common interrupt dispatcher. The interrupt is processed by the common interrupt dispatcher without interruption, and the first and second interrupts are re-enabled.

A still further aspect of the invention includes a method of operating a processor. This method includes the steps of providing a common interrupt dispatcher having an interrupt routine that checks a mode identifier to determine whether a received interrupt call was of a first or second interrupt type, and processes both interrupt types. Additional steps include inserting at a second interrupt address in an interrupt vector table, an instruction that branches to the common interrupt dispatcher. Further steps include receiving an interrupt of the second interrupt type, branching to the second vector address, and setting the mode identifier to indicate an interrupt of the second type was received. The instruction to branch to the common interrupt dispatcher is executed, and the interrupt is processed by the common interrupt dispatcher without interruption. to here Another aspect of the present invention includes an operating system for a processor. The operating system includes. The system further includes a common interrupt dispatcher, and an instruction in a first vector address executable upon receipt of an IRQ interrupt request, that disables the IRQ and FIQ interrupt modes. An other instruction is located at a second vector address executable upon receipt of a second interrupt request, that branches to the common interrupt dispatcher. The common interrupt dispatcher has an interrupt routine that checks the mode identifier to determine whether a received interrupt call was of the first or second interrupt types, processes the interrupt, and then re-enables the first and second interrupt types. The IRQ and FIQ interrupts are processed by the common interrupt dispatcher without interruption.

Another aspect of the invention includes an article of manufacture. The article of manufacture includes a computer usable medium having a computer readable program code embodied therein. The computer usable medium includes computer readable program code for providing a common interrupt dispatcher for a processor having a first interrupt mode and a second interrupt mode to respectively accept interrupt requests of first and second types, the second interrupt mode having a higher priority than the first interrupt mode, both first and second interrupt modes being disableable to selectively reject interrupt requests of the first and second interrupt types. The processor also includes a mode status indicator to indicate the current mode of the processor, and an interrupt vector table having a first vector address executable upon receipt of an interrupt request of the first type, and a second vector address executable upon receipt of an interrupt request of the second type, the first vector address preceding the second vector address in the vector table. The processor is adapted to execute at least one instruction in the interrupt vector table without interruption, upon receipt of an interrupt request. Computer readable program code is also provided for inserting an instruction into the first vector address that disables the first and second interrupt modes. Computer readable program code is also included for inserting an other instruction at the second vector address, that branches to the common interrupt dispatcher. This embodiment further includes computer readable program code for providing the common interrupt dispatcher with an interrupt routine that checks the mode identifier to determine whether a received interrupt call was a first interrupt type or a second interrupt type, processes the interrupt, and then re-enables the first and second interrupt modes. Interrupt requests are processed by the common interrupt dispatcher without interruption.

A yet further aspect of the invention includes computer readable program code for merging tiered interrupts into a unified interrupt handling system for an operating system of an embeddable processor. The computer readable program code includes computer readable program code for providing a common interrupt dispatcher for a processor having a first interrupt mode and a second interrupt mode to respectively accept interrupt requests of first and second types, the second interrupt mode having a higher priority than the first interrupt mode, both first and second interrupt modes being disableable to selectively reject interrupt requests of the first and second interrupt types. The processor also includes a mode status indicator to indicate the current mode of the processor, and an interrupt vector table having a first vector address executable upon receipt of an interrupt request of the first type, and a second vector address executable upon receipt of an interrupt request of the second type, the first vector address preceding the second vector address in the vector table. The processor is adapted to execute at least one instruction in the interrupt vector table without interruption, upon receipt of an interrupt request. This aspect also includes computer readable program code for inserting an instruction into the first vector address that disables the first and second interrupt modes, and computer readable program code for inserting an other instruction at the second vector address, that branches to the common interrupt dispatcher. Computer readable program code is also included for providing the common interrupt dispatcher with an interrupt routine that checks the mode identifier to determine whether a received interrupt call was a first interrupt type or a second interrupt type, processes the interrupt, and then re-enables the first and second interrupt modes. Interrupt requests are processed by the common interrupt dispatcher without interruption.

BRIEF DESCRIPTION OF THE DRAWINGS

The above and other features and advantages of this invention will be more readily apparent from a reading of the following detailed description of various aspects of the invention taken in conjunction with the accompanying drawings, in which.

DETAILED DESCRIPTION

Figure 1:
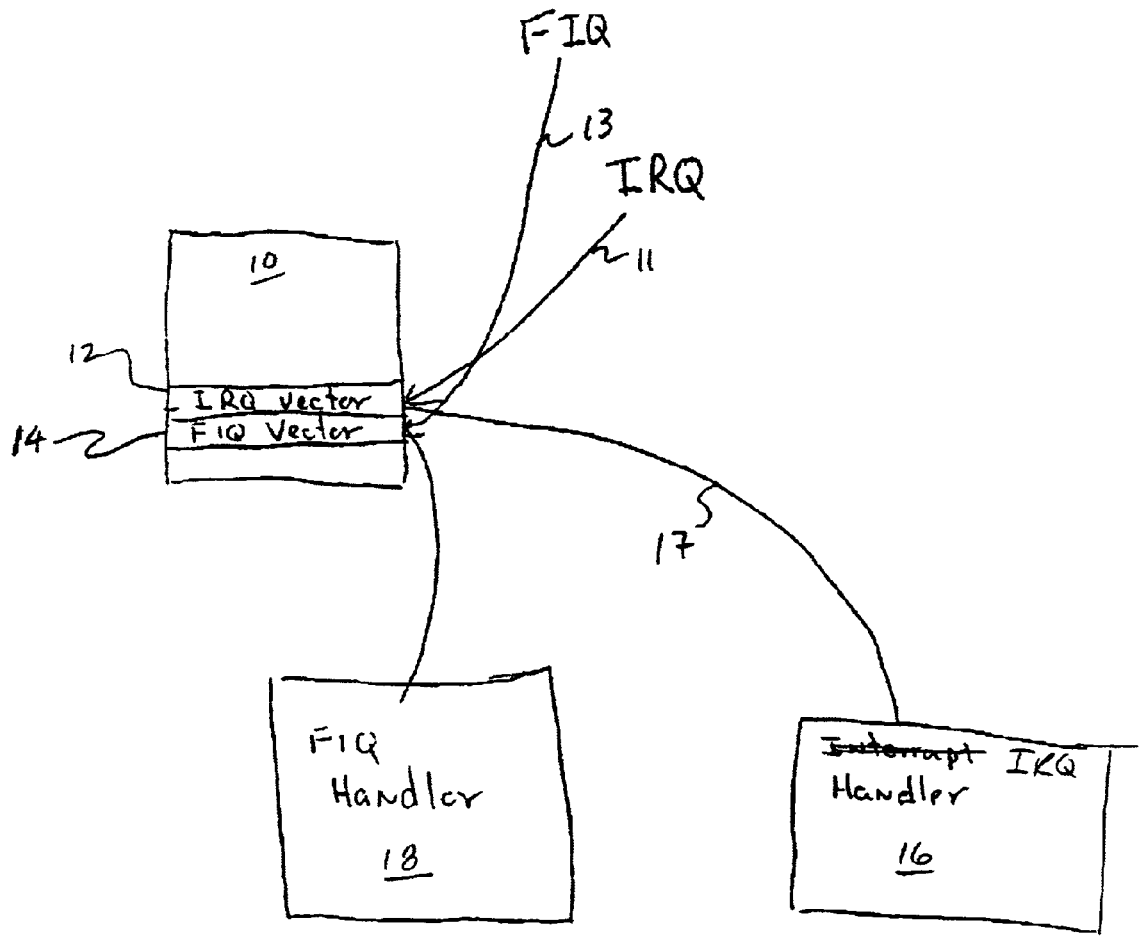
FIG. 1 is a functional block diagram of prior art exception handling in an ARM® processor.

Referring to the figures set forth in the accompanying Drawings, the illustrative embodiments of the present invention will be described in detail hereinbelow. For clarity of exposition, like features shown in the accompanying Drawings shall be indicated with like reference numerals and similar features as shown in alternate embodiments in the Drawings shall be indicated with similar reference numerals.

An embodiment of the invention includes an instruction sequence and method for processors that implement ARM® architecture (and similar multiple interrupt mode architectures) as described herein. This embodiment of the present invention allows users of such processor architectures to merge multiple interrupt types, such as Fast Interrupt (FIQ) exceptions and normal Interrupt (IRQ) exceptions, into a single exception handling instruction stream, while still allowing the processor to discriminate between the two interrupt sources. The embodiment(s) of the present invention may be implemented as part of a Board Support Package (BSP) for such processors. The embodiment(s) may also be implemented as part of the kernel of an operating system for such processors.

Turning to FIG. 1, previous approaches separate interrupt handling by use of discrete addresses within exception vector table 10. Address 12 is used for IRQ exceptions, while address 14 is used for FIQ exceptions. As shown, IRQ and FIQ exceptions 11 and 13, generated either internally (i.e., by the processor) or externally (i.e., by hardware peripherals), branch program execution to addresses 12 and 14, respectively. Vector addresses 12 and 14 typically include branch instructions that put the address of discrete IRQ and FIQ Handlers (16 and 18, respectively) in the program counter, to branch program execution thereto. As mentioned hereinabove, in the ARM® architecture, FIQs are given a higher priority than IRQs. As such, the IRQ instruction stream 17 (i.e., between IRQ vector 12 and Interrupt Handler 16) is interruptible by subsequent FIQ exceptions. Disadvantageously, this arrangement may result in the inability of operating systems to support calls from both IRQ and FIQ devices. For example, this aspect may generate complex nested exception routines, which tend to be problematic in many applications, such as those in which FIQs are used by the OS to perform routine bookkeeping functions. Attempts to merge these two streams may lead to an internal race condition within the processor, making it difficult or impossible for the operating system to properly process.

As mentioned hereinabove, many commonly available ARM® processors handle exceptions by making use of banked registers to save state. Interrupt disable flags may be set to try and prevent otherwise unmanageable nestings of exceptions. When multiple exceptions arise simultaneously, a fixed priority determines the order in which they are handled. For example, in the SA-110™ processor, the priority is as follows: 1) Reset (highest priority); 2) Data abort; 3) FIQ; 4) IRQ; 5) Prefetch abort; and 6) Undefined instruction, software interrupt (lowest priority).

Figure 2:
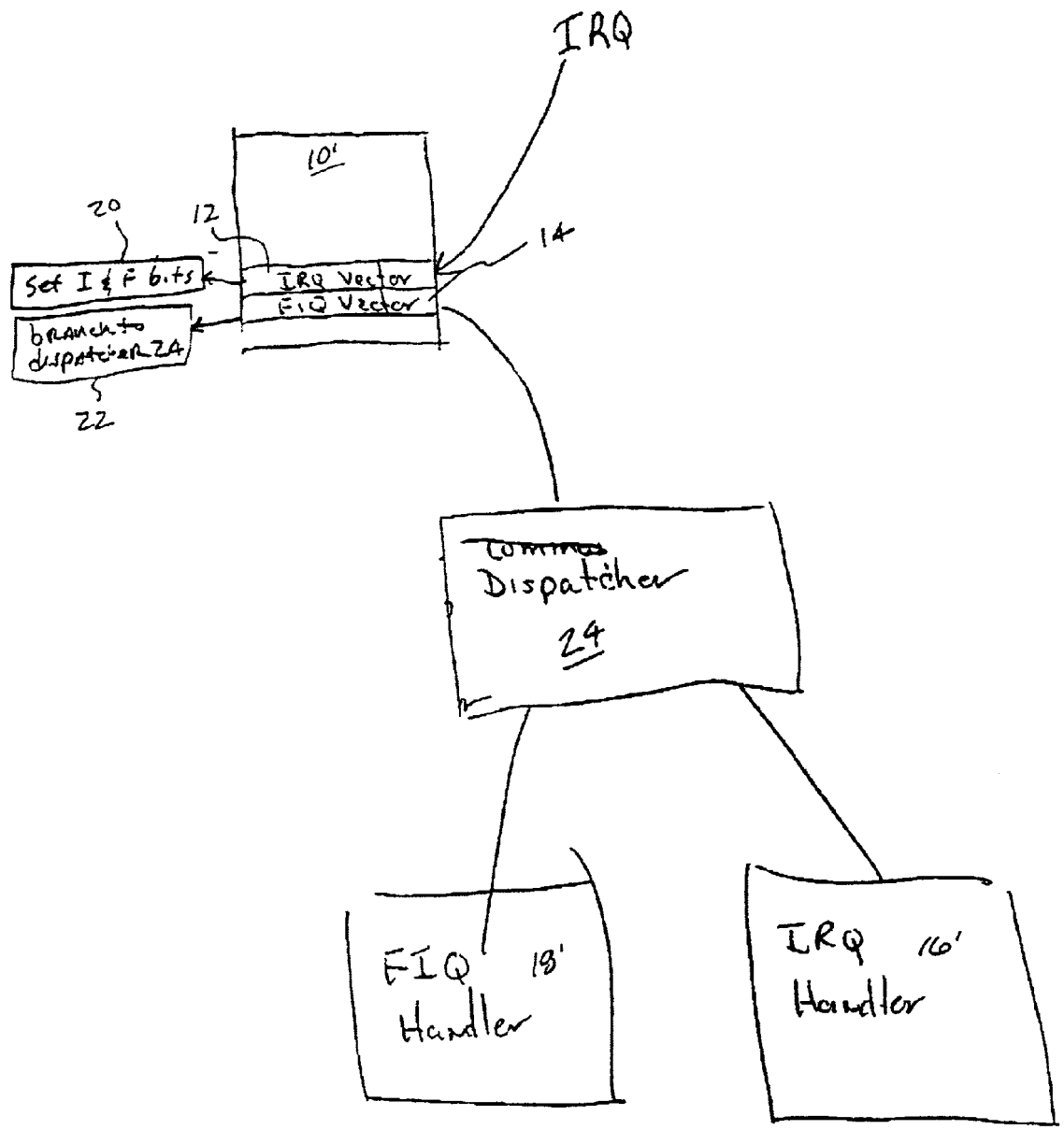
FIG. 2 is a functional block diagram of exception handling in an ARM® processor according to the present invention.

This embodiment of the present invention makes use of specific architecture features to merge the two interrupt streams into a single handler, while unambiguously identifying the source of each interrupt. Turning now to FIG. 2, this embodiment of the present invention includes a single instruction referred to as a Move Status Register (MSR) instruction 20. This instruction 20 serves to simultaneously disable both FIQs and IRQs upon receipt of an IRQ exception. This instruction 20 is inserted at IRQ vector address 12. Thus, upon receipt of an IRQ, i.e., when the PC branches to IRQ vector 12, the MSR instruction 20 disables any subsequent interrupts (both IRQ and FIQ). Instruction 20 accomplishes this by inserting an F bit in the Current Processor Status Register (CPSR) to disable FIQs, and by leaving the I bit set (the I bit is automatically set upon a branch to the IRQ vector 12) or re-setting the I bit.

The skilled artisan will recognize that in conventional ARM® processors, the "I" bit is set in the CPSR when an IRQ occurs. This blocks any further IRQs until the current IRQ has been processed. The "F" bit is typically set when an FIQ occurs. This blocks further FIQs until the current FIQ has been processed. Since FIQs take priority over IRQs, both IRQs and FIQs are effectively blocked during processing of an FIQ.

This embodiment of the present invention also includes a branch instruction 22, which instructs the processor to branch to an address of a common dispatcher 24 (discussed hereinbelow). Instruction 22 is placed at FIQ vector address 14 of the exception table 10. As shown, the IRQ vector address 12 precedes the FIQ vector address 14 in conventional ARM® exception vector tables. As such, absent a branch instruction or other exception, such as a reset, instruction execution will generally advance from address 12 to address 14.

As mentioned hereinabove, the ARM® architecture sets mode bits within the CPSR that correspond to the type of exception, i.e., either IRQ or FIQ. The architecture also ensures that the first instruction at the vector table is executed without interruption. This embodiment utilizes this latter feature to effectively ensure that the inserted MSR instruction 20 is properly executed.

After executing the first inserted instruction 20 located at vector address 12, execution falls through to the next instruction address, which in the embodiment shown, is at FIQ vector address 14. Branch instruction 22 previously inserted at this address 14 then instructs the processor to branch to common dispatcher 24.

Alternatively, in the event an FIQ exception 13 is received, the PC will branch directly to FIQ address 14, which in turn, will branch to the common dispatcher 24.

This embodiment of the present invention thus effectively provides a common, or merged, instruction stream at dispatcher 24 for both IRQ and FIQ interrupts. Common dispatcher 24 may process the interrupt itself, e.g., to function as a single stack interrupt handler. Additionally or alternatively, dispatcher 24 may identify the source of the exception (FIQ or IRQ) by examining the Current Processor Status Register (CPSR) mode bits. Once this determination has been made, dispatcher 24 may appropriately branch to either FIQ handler 18' or IRQ handler 16' for further processing in a conventional manner.

Advantageously, this embodiment of the present invention provides a single interrupt stream for both IRQ and FIQ exceptions, to prevent the prior art occurrence of IRQ exception handling being interrupted by FIQ exceptions. This advantage is particularly apparent in environments in which a single interrupt stack is required. The invention also advantageously permits both the FIQ and IRQ external inputs (not shown) of the ARM® processor to be used by the operating system. This enables users, such as manufacturers of embedded applications, to utilize both IRQ and FIQ pins of ARM® processors, to potentially reduce parts count for advantageous cost savings.

An embodiment of the present invention has been described herein for use with ARM® processors. The skilled artisan will recognize however, that the present invention may be implemented in substantially any processor environment in which: an IRQ vector register precedes an FIQ vector in an exception vector table; it is possible to identify the type of exception; at least one instruction may be processed without interruption; and all interrupts are maskable (i.e., may be shut off) in a single instruction; without departing from the spirit and scope of the invention.

Having thus described the invention, what is claimed is:

1. A method comprising the steps of:

merging a first type interrupt and a second type interrupt into a single service routine upon receipt of the first type interrupt and the second type interrupt by a processor having an interrupt vector table for operationally sequential placement and execution of a first type vector address corresponding to the first type interrupt and a second type vector address corresponding to the second type interrupt, the second type interrupt having a higher priority than the first type interrupt, the merging step further comprising the steps of:
  (a) providing a common interrupt dispatcher;
  (b) inserting a first instruction at the first type vector address that disables the second type interrupt;
  (c) inserting a second instruction at the second type vector address that branches to the common interrupt dispatcher; and
  (d) providing the common interrupt dispatcher with an interrupt routine that processes the first type interrupt, and then re-enables second type interrupts.

2. The method of claim 1, wherein the inserting step (b) comprises inserting a single instruction at the first vector address that disables the first type and second type interrupts.

3. The method of claim 2, wherein the providing step (d) comprises re-enabling the first type interrupt and the second type interrupt.

4. The method of claim 1, wherein the providing step (d) further comprises determining whether an interrupt is of the first type or of the second type.

5. The method of claim 4, wherein the providing step (d) comprises checking a mode identifier to identify the type of the interrupt.

6. The method of claim 4, wherein the providing step (d) further comprises the steps of
  providing a first interrupt handler and a second interrupt handler, and
  providing the single service routine with an instruction that branches the first type interrupts to the first interrupt handler the second type interrupts to the second interrupt handler.

7. The method of claim 1, wherein the first type interrupts are IRQ interrupts, and the second type interrupts are FIQ interrupts.

8. The method of claim 1, wherein the first instruction is a single instruction.

9. A method of configuring an operating system of an ARM® processor comprising the steps of:

merging IRQ interrupts and FIQ interrupts into a single service routine upon receipt of the IRQ and FIQ interrupts by a processor having an interrupt vector table for operationally sequential placement and execution of IRQ vector addresses corresponding to the IRQ interrupts and an FIQ vector addresses corresponding to the FIQ interrupts, the merging step further comprising the steps of:

(a) providing a common interrupt dispatcher;

(b) inserting at the IRQ vector address a single instruction that disables an FIQ interrupt mode;

(c) inserting at the FIQ vector address a second instruction that branches to the common interrupt dispatcher; and (d) providing the common interrupt dispatcher with the single service routine that processes an interrupt, and the re-enables the FIQ interrupt mode.

10. The method of claim 9, wherein the inserting step (b) comprises inserting an instruction at the IRQ vector address that disables an IRQ interrupt mode and the FIQ interrupt mode.

11. The method of claim 10, wherein the providing step (d) comprises re-enabling the IRQ and FIQ interrupt modes.

12. The method of claim 1, wherein the providing step (d) further comprises determining whether an interrupt is an IRQ interrupt or an FIQ interrupt.

13. The method of claim 12, wherein the providing step (d) comprises checking a mode identifier to identify the type of the interrupt.

14. The method of claim 12, wherein the providing step (d) further comprises the steps of
providing an IRQ interrupt handler and an FIQ interrupt handler, and
providing the single service routine with an instruction that branches the IRQ interrupts to the IRQ interrupt handler the FIQ type interrupts to the FIQ interrupt handler.

15. A method comprising the steps of:

operating a processor capable of receiving first type interrupts and second type interrupts, at operationally sequentially placed first type and second type interrupt vector addresses, the first type vector address corresponding to the first type interrupts and the second type vector address corresponding to the second type interrupts, the second type interrupts having a higher priority than the first type interrupts, the operating step further comprising the steps of:

(a) providing a common interrupt dispatcher having an interrupt routine that check a mode identifier to determine whether a received interrupt was of a first and second type, and processes the interrupt;

(b) inserting at the first type vector address a first instruction that disables subsequent interrupts of the first and second types;

(c) inserting at the second type vector address a second instruction that branches to the common interrupt dispatcher, (d) receiving a first interrupt at the first type vector address;

(e) setting the mode identifier to indicate a first type interrupt is received;

(f) executing the instruction to disable the first and second type interrupt;

(g) executing the other second instruction to branch to the common interrupt dispatcher;

(h) processing the first type interrupt with the common interrupt dispatcher without interruption; and (i) re-enabling the first and second types interrupts.

16. The method of claim 15, wherein the processor is an ARM® processor and the first type interrupt is an IRQ interrupt and the second type interrupt is an FIQ interrupt.

17. A method comprising the steps of:

operating a processor capable of receiving first type interrupts and second type interrupts, at operationally sequentially placed first type and second type interrupt vector addresses, the first type vector address corresponding to the first type interrupts and the second type vector address corresponding to the second type interrupts, the second type interrupts having a higher priority than the first type interrupts, the operating step further comprising the steps of;

(a) providing a common interrupt dispatcher having an interrupt routine that check a mode identifier to determine whether a received interrupt was of a first and second type, and processes the interrupt;

(b) inserting at the second type vector address a first instruction that branches to the common interrupt dispatcher;

(c) receiving a first type interrupt at the second type vector address;

(d) setting the mode identifier to indicate a second type interrupt is received;

(e) executing the first instruction to branch to the common interrupt dispatcher; and (h) processing the second type interrupt with the common interrupt dispatcher without interruption.

18. The method of claim 17, wherein the processor is an ARM® processor and the first type interrupt is an IRQ interrupt and the second type interrupt is an FIQ interrupt.

19. An operating system comprising:

a code for merging a first type interrupt and a second type interrupt into a single service routine upon receipt of the first type interrupt and the second type interrupt by a processor having an interrupt vector table for operationally sequential placement and execution of a first type vector address corresponding to the first type interrupt and a second type vector address corresponding to the second type interrupt, the second type interrupt having a higher priority than the first type interrupt, the code further comprising:

(a) a first instruction that disables first and second type interrupts disposed in the first type vector address;

(b) a second instruction that branches to a common interrupt dispatcher, disposed at the second type vector address;

(c) the common interrupt dispatcher having an interrupt routine that checks a mode identifier to determine whether a received interrupt was of the first or second type and then re-enables the first and second type interrupts.

20. The operating system of claim 19, wherein first and second type interrupts are processed by the common interrupt dispatcher without interrupt.

21. A operating system of claim 19, wherein the processor is an ARM® processor, the first type interrupt is an IRQ interrupt, and the second type interrupt is and FIQ interrupt.

22. A method of operating an ARM® processor, comprising the steps of:

(a) providing the system of claim 21;

(b) receiving an IRQ interrupt;

(c) branching to an IRQ vector address;

(d) setting a mode identifier to indicate an IRQ interrupt was received;

(e) executing the first instruction to disable the IRQ and FIQ interrupts;

(f) executing the second instruction to branch to the common interrupt dispatcher;

(g) processing the IRQ interrupt with the common interrupt dispatcher without interruption; and (h) re-enabling the IRQ and FIQ interrupts.

23. A method of operating an ARM® processor, comprising the steps of:

(a) providing the system of claim 21;

(b) receiving an FIQ interrupt;

(c) branching to an FIQ vector address;

(d) setting the mode identifier to indicate an FIQ interrupt was received;

(e) executing the second instruction to branch to the common interrupt dispatcher;

(f) processing the FIQ interrupt with the common interrupt dispatcher without interruption.

24. An operating system comprising:

a code for merging a first type interrupt and a second type interrupt into a single service routine upon receipt of the first type interrupt and the second type interrupt into a single service an interrupt vector table for operationally sequential placement and execution of a first type vector address corresponding to the first type interrupt and a second type vector address corresponding to the second type interrupt, the second type interrupt having a higher priority than the first type interrupt, the code further comprising:

(a) a first instruction that disables first and second type interrupts, disposed in the first type vector address;

(b) a second instruction that branches to a common interrupt dispatcher, disposed at the second type vector address;

(c) the common interrupt dispatcher having an interrupt routine that checks a mode identifier to determine whether a received interrupt was of the first or second type and then re-enables the first and second type interrupts.

25. An article of manufacture comprising a computer usable medium having a computer readable program code embodied therein, said computer usable medium having:

computer readable program code for providing a common interrupt dispatcher for a processor having:

(a) a first interrupt mode and a second interrupt mode to respectively accept interrupt requests of first and second types, the second interrupt mode having a higher priority that the first interrupt mode, both first and second interrupt modes being disableable to selectively reject interrupt requests of the first and second interrupt types;

(b) a mode status indicator to indicate the current mode of the processor, (c) a first vector address operatively associated with receipt of interrupt requests of the first type, and a second vector address operatively associated with receipt of interrupt requests of the second type, the first vector address operationally preceding the second vector address in the vector table;

computer readable program code for inserting a first instruction at the first vector address that disables the first and second interrupt modes;

computer readable program code for inserting a second instruction at the second vector address, that branches to the common interrupt dispatcher;

computer readable program code for providing the common interrupt dispatcher with an interrupt routine that checks the mode identifier to determine whether a received interrupt call was a first interrupt or a second interrupt type, the interrupt routine processes the interrupt and re-enables the first and second interrupt modes.

26. The article of manufacture of claim 25, further comprising:

computer readable program code for providing the interrupt routine with an instruction that branches first interrupts to a first interrupt handler, and branches second interrupts to a second interrupt handler.

27. The article of manufacture of claim 26, wherein the first interrupt is an IRQ interrupt, and the second interrupt is an FIQ interrupt.

28. A method of providing a unified interrupt handling system for an embeddable processor having multiple interrupt types, said method comprising the steps of:

(a) providing a processor having a first interrupt mode for accepting interrupt requests of a first type at a first type vector address, and a second interrupt mode for accepting interrupt requests of a second type at a second type vector address, the second interrupt mode having a higher priority than the first interrupt mode, both first and second interrupt modes being selectively disableable to selectively reject interrupt requests of the first and second interrupt requests of the first and second interrupt types;

(b) providing a mode status indicator to indicate the current mode of the processor;

(c) the processor being configured so that the first type vector address operationally precedes the second vector address;

(d) the processor being adapted to execute at least one instruction at the first type and second type vector addresses without interrupt, upon receipt of an interrupt request;

(e) providing a common interrupt dispatcher;

(f) inserting a first instruction at the first vector address that disables the second interrupt type;

(g) inserting at the second vector address, a second instruction that branches to the common interrupt dispatcher; and (h) providing the common interrupt dispatcher with an interrupt routine that processes the interrupt, and the re-enables the second interrupt types.

* * * * *